US012720300B2

(12) United States Patent
Tsai et al.

(10) Patent No.: US 12,720,300 B2
(45) Date of Patent: Aug. 25, 2026

(54) METHOD AND APPARATUS FOR BEAM CAPABILITY REPORTING IN A RELAY-TYPE WIRELESS DEVICE

(71) Applicant: MediaTek Inc., Hsinchu City (TW)

(72) Inventors: Lung-Sheng Tsai, Hsinchu City (TW); Chun-Hao Fang, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 329 days.

(21) Appl. No.: 18/372,612

(22) Filed: Sep. 25, 2023

(65) Prior Publication Data

US 2024/0129716 A1 Apr. 18, 2024

Related U.S. Application Data

(60) Provisional application No. 63/382,302, filed on Nov. 4, 2022, provisional application No. 63/379,775, filed on Oct. 17, 2022, provisional application No. 63/379,328, filed on Oct. 13, 2022.

(51) Int. Cl.

*H04W 4/00* (2018.01)
*H04W 8/22* (2009.01)
*H04W 16/28* (2009.01)
*H04W 88/04* (2009.01)

(52) U.S. Cl.

CPC ............ *H04W 8/22* (2013.01); *H04W 16/28* (2013.01); *H04W 88/04* (2013.01)

(58) Field of Classification Search

CPC ............................................ H04W 88/00–188
See application file for complete search history.

(56) References Cited

U.S. PATENT DOCUMENTS

| | | | | |
|---|---|---|---|---|
| 12,418,872 | B2 * | 9/2025 | Zou | H04W 56/001 |
| 2021/0075474 | A1 * | 3/2021 | Raghavan | H04B 7/0626 |
| 2021/0127368 | A1 * | 4/2021 | Abedini | H04L 5/0053 |
| 2021/0306064 | A1 * | 9/2021 | Abedini | H04B 7/043 |
| 2023/0164547 | A1 * | 5/2023 | Dai | H04W 12/03 713/150 |
| 2024/0014959 | A1 * | 1/2024 | Bhamri | H04L 5/0073 |
| 2024/0187086 | A1 * | 6/2024 | Elshafie | H04B 7/15528 |
| 2025/0219680 | A1 * | 7/2025 | Chi | H04L 5/0005 |

* cited by examiner

*Primary Examiner* — Bob A Phunkulh

(74) *Attorney, Agent, or Firm* — Andy M. Han; Han IP PLLC

(57) ABSTRACT

Examples pertaining to beam capability reporting in a relay-type wireless device are described. An apparatus may serve as a relay between a user equipment (UE) and a wireless node of a wireless network. An apparatus may also report its beam capability information for a wireless link between the apparatus and the UE to the wireless node. The beam capability information may indicate one or more non-overlapped or partially-overlapped beams.

20 Claims, 8 Drawing Sheets

(A)

(B)

200

400

CONFIGURE, BY A PROCESSOR OF AN APPARATUS, THE APPARATUS TO SERVE AS A RELAY BETWEEN A UE AND A WIRELESS NODE OF A WIRELESS NETWORK
710

REPORT, BY THE PROCESSOR, THE APPARATUS' BEAM CAPABILITY INFORMATION FOR A WIRELESS LINK BETWEEN THE APPARATUS AND THE UE TO THE WIRELESS NODE, WHEREIN THE BEAM CAPABILITY INFORMATION INDICATES ONE OR MORE NON-OVERLAPPED OR PARTIALLY-OVERLAPPED BEAMS
720

FIG. 7

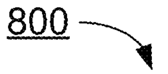

RECEIVE, BY A PROCESSOR OF A WIRELESS NODE, AN APPARATUS' BEAM CAPABILITY INFORMATION FOR A WIRELESS LINK BETWEEN THE APPARATUS AND A UE FROM THE APPARATUS, WHEREIN THE BEAM CAPABILITY INFORMATION INDICATES ONE OR MORE NON-OVERLAPPED OR PARTIALLY-OVERLAPPED BEAMS
810

TRANSMIT, BY THE PROCESSOR, BEAM TRAINING INFORMATION FOR THE WIRELESS LINK TO THE APPARATUS, WHEREIN THE BEAM TRAINING INFORMATION IS DETERMINED BASED ON THE BEAM CAPABILITY INFORMATION
820

FIG. 8

METHOD AND APPARATUS FOR BEAM CAPABILITY REPORTING IN A RELAY-TYPE WIRELESS DEVICE

CROSS REFERENCE TO RELATED PATENT APPLICATION(S)

The present disclosure is part of a non-provisional application claiming the priority benefit of U.S. Patent Application No. 63/379,328, filed 13 Oct. 2022, U.S. Patent Application No. 63/379,775, filed 17 Oct. 2022, and U.S. Patent Application No. 63/382,302, filed 4 Nov. 2022. The contents of aforementioned applications are herein incorporated by reference in their entirety.

TECHNICAL FIELD

The present disclosure is generally related to mobile communications and, more particularly, to beam capability reporting in a relay-type wireless device.

BACKGROUND

Unless otherwise indicated herein, approaches described in this section are not prior art to the claims listed below and are not admitted as prior art by inclusion in this section.

To counteract the large path and penetration losses in mobile communications, repeater (or called relay) is introduced in $3^{rd}$ Generation Partnership Project (3GPP) to extend coverage for $5^{th}$ Generation (5G) New Radio (NR) networks. In general, a repeater with compatibility of legacy user equipment and lower cost of deployment is used to decode/amplify radio signals and forward the amplified signals from a base station (BS) to a user equipment (UE) (or vice versa). However, the details of introducing repeater in 5G NR networks have not been fully discussed yet and some issues need to be solved. One of the issues relates to what capability information the repeater needs to report with respect to the beams supported for the access link. Therefore, there is a need for a solution of beam capability reporting in a relay-type wireless device.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to beam capability reporting in a relay-type wireless device.

In one aspect, a method may involve a processor of an apparatus (e.g., a relay-type wireless device) configuring the apparatus to serve as a relay between a UE and a wireless node of a wireless network. The method may also involve the processor reporting the apparatus' beam capability information for a wireless link between the apparatus and the UE to the wireless node. The beam capability information may indicate one or more non-overlapped or partially-overlapped beams.

In one aspect, an apparatus may comprise a transceiver which, during operation, wirelessly communicates with a UE and a network node of a wireless network. The apparatus may also comprise a processor communicatively coupled to the transceiver. The processor, during operation, may perform operations comprising configuring the apparatus to serve as a relay between the UE and the wireless node; and reporting, via the transceiver, the apparatus' beam capability information for a wireless link between the apparatus and the UE to the wireless node. The beam capability information may indicate one or more non-overlapped or partially-overlapped beams.

In one aspect, a method may involve a processor of a wireless node (e.g., a BS) receiving an apparatus' beam capability information for a wireless link between the apparatus and a UE from the apparatus. The beam capability information may indicate one or more non-overlapped or partially-overlapped beams. The method may also involve the processor transmitting beam training information for the wireless link to the apparatus. The beam training information may be determined based on the beam capability information.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), beyond 5G (B5G), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 7 is a flowchart of an example process in accordance with an implementation of the present disclosure.

FIG. 8 is a flowchart of another example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to beam capability reporting in a relay-type wireless device. According to the present disclosure, a number of possible solutions may be implemented separately or jointly. That is, although these possible solutions may be described below separately, two or more of these possible solutions may be implemented in one combination or another.

Figure 1:
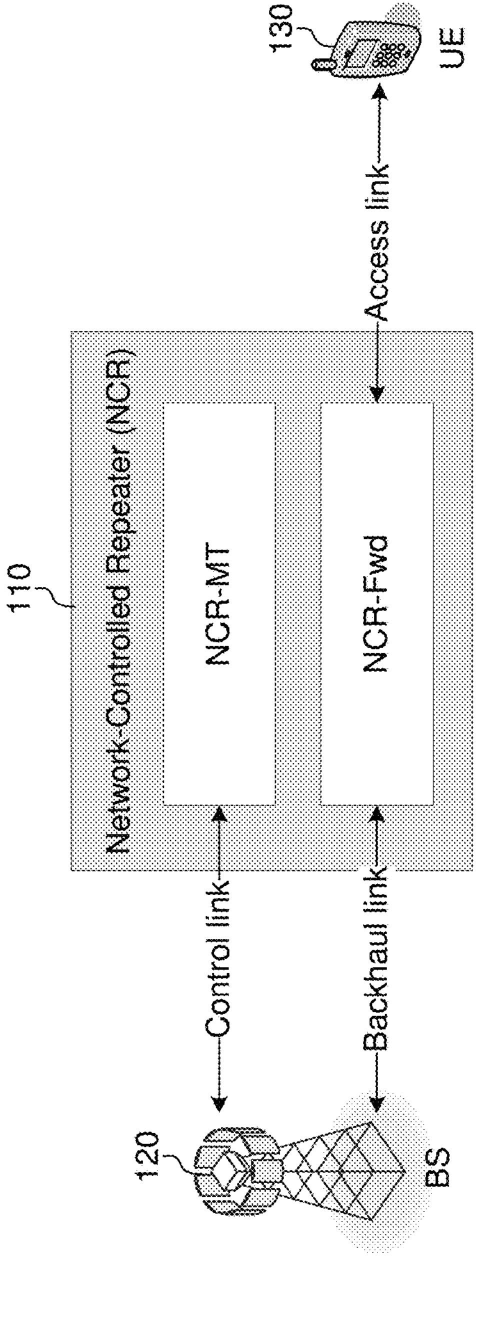
FIG. 1 is a diagram depicting an example scenario of a framework for network-controlled repeater (NCR) in accordance with an implementation of the present disclosure.
Figure 1:

FIG. 1 illustrates an example scenario 100 of a framework for NCR in accordance with an implementation of the present disclosure. As shown in FIG. 1, an NCR 110 is located/deployed between a BS 120 and a UE 130, and is responsible for amplifying/decoding and forwarding radio signals therebetween. The NCR 110 at least includes two function entities, such as the NCR-mobile termination (MT) entity and the NCR-forwarding (Fwd) entity. The NCR-MT entity is responsible for communicating with the BS 120 via a control link (or called C-link) to enable information (e.g., side control information) exchange. The C-link may be based on the NR Uu interface. The NCR-Fwd entity is responsible for performing the amplify-and-forwarding (or decode-and-forwarding) of downlink (DL) or uplink (UL) radio signals between the BS 120 and the UE 130 via the backhaul link (or called B-link) and the access link (or called A-link). The operations of the NCR-Fwd entity may be controlled according to the received side control information from the BS 120. It is noteworthy that any wireless device capable of providing the aforementioned functionalities may also serve as a relay. For instance, a reconfigurable intelligent surface (RIS) may implement the forwarding functionality by reflecting received signals, or a UE may serve as a relay in peer-to-peer communications, e.g., sidelink (SL) communications. Alternatively, a repeater may also receive control signaling from a UE, i.e., the relay-type wireless device under the schemes of the present disclosure is not limited to how it receives control signaling.

In current 5G NR (e.g., compliant with 3GPP Release 18), it only had been discussed that a repeater/relay may report its capability for the supporting beam patterns and spatial relationships among the beams. However, details regarding what specific information should be used to indicate the beam patterns and spatial relationships are not defined yet. Therefore, there is a need for a solution of beam capability reporting in a relay-type wireless device to solve the aforementioned issues.

In view of the above, the present disclosure proposes a number of schemes pertaining to beam capability reporting in a relay-type wireless device. According to the schemes of the present disclosure, beam capability information indicating one or more non-overlapped or partially-overlapped beams is reported as a reference for the BS to figure out the relay's supporting beam patterns and spatial relationships among the beams for the access link. Such beam capability information can better abstract the spatial relationships among the beams for capability reporting, when compared to other detailed beam characteristics, such as broadside angle, beamwidths, and beam direction. The rationale behind reporting the number of non-overlapped or partially-overlapped beams is elaborated as follows. Specifically, it is expected that the signal quality for each non-overlapped beam may be very different, and knowing the broadside angle and beamwidths of a particular beam is not really useful or meaningful for the BS, since the BS is not aware of the relative position between the relay and the UE. Furthermore, for beam training, the BS does not need to know the beam direction of a particular beam, but it can be beneficial for the BS to know whether the beams are largely overlapped or not. For instance, if two beams are overlapped, it may be inefficient to train twice for these two beams with similar coverage. Besides, reporting these detailed beam characteristics may lead to significant signaling overhead. Accordingly, by applying the schemes of the present disclosure, hierarchical beam management may be realized, and the signaling overhead in beam training and beam capability reporting may be reduced.

Figure 2:
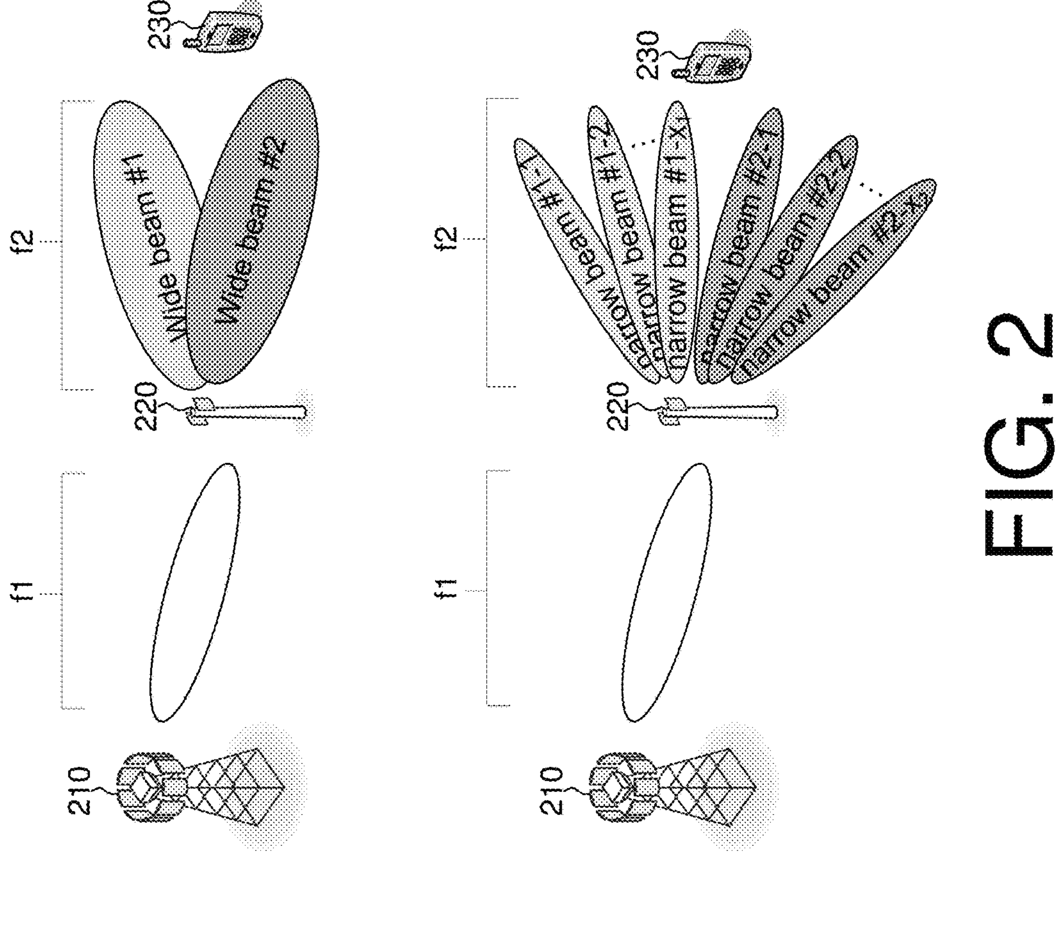
FIG. 2 is a diagram depicting an example scenario of hierarchical beam patterns in accordance with an implementation of the present disclosure.

FIG. 2 illustrates an example scenario 200 of hierarchical beam patterns in accordance with an implementation of the present disclosure. Scenario 200 involves a BS 210 (e.g., an evolved Node-B (eNB), a Next Generation Node-B (gNB), or a transmission/reception point (TRP)), a wireless device 220 (e.g., an RIS, a UE, or a repeater), and a UE 230 (e.g., a smartphone, a smartwatch, a personal digital assistant, a digital camera, a computing equipment such as a tablet computer, a laptop computer or a notebook computer, or a machine type apparatus such as an a smart thermostat, a smart fridge, a smart door lock, a wireless speaker or a home control center). The BS 210 and/or the wireless device 220 may be a part of a wireless network (e.g., an LTE network, a 5G NR network, an IoT network, or a 6G network). Part (A) of FIG. 2 shows a coarse beam pattern for the access link between the wireless device 220 and the UE 230. In the coarse beam pattern, the wireless device 220 is able to form two wide beams (i.e., beams with beamwidth greater than a certain threshold) which are non-overlapped or partially-overlapped with each other. Part (B) of FIG. 2 shows a fine beam pattern for the access link between the wireless device 220 and the UE 230. In the fine beam pattern, the relay-type wireless device 220 is able to form a number of narrow beams, i.e., beams with beamwidth less than a certain threshold. In particular, the narrow beams with beam indices 1-1 to 1-$x_1$ are associated with the first wide beam (denoted as wide beam #1 in FIG. 2), and the narrow beams with beam indices 2-1 to 2-$x_2$ are associated with the second wide beam (denoted as wide beam #2 in FIG. 2). More specifically, the beams supported for the control/backhaul link and the access link may be operated in the same frequency or different frequencies (denoted as f1 and f2 in FIG. 2). For instance, f1 and f2 may be the same frequency (e.g., f1=2.5

GHz, f2=2.5 GHz), or f1 and f2 may be different frequencies (e.g., f1 is in frequency range 1 (FR1) and f2 is in frequency range 2 (FR2), or f1=2.5 GHz, f2=6 GHz, i.e., f1 and f2 are both in FR1, but using different center frequencies). It is noteworthy that, with the hierarchical beam patterns, only $x_1+1$ or $x_2+1$ times of beam sweeping is required for communications over the access link. In contrast, without the hierarchical beam patterns, there may be $x_1+x_2$ times of beam sweeping required for communications over the access link.

Figure 3:
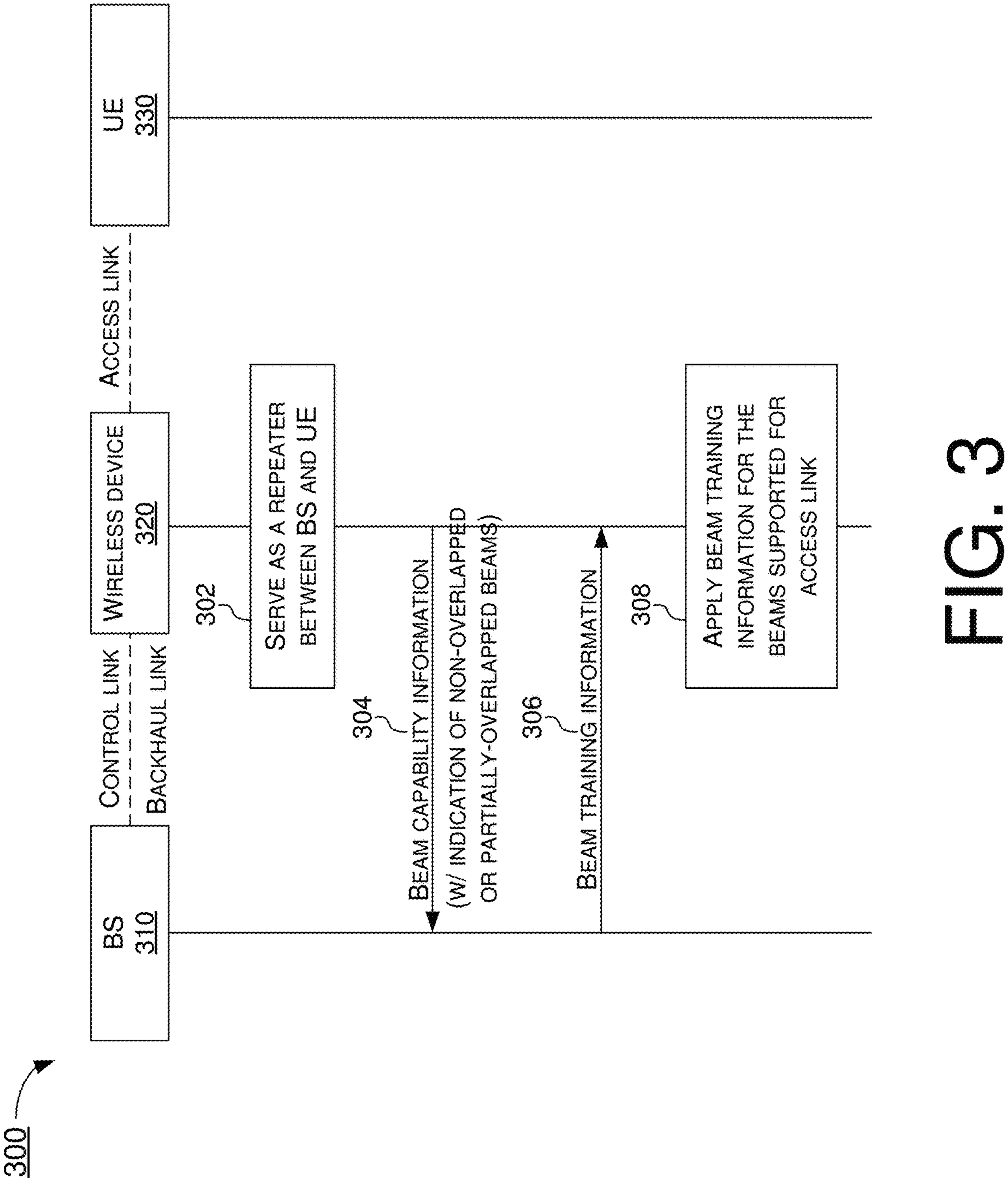
FIG. 3 is a diagram depicting an example scenario of beam capability reporting in accordance with an implementation of the present disclosure.

FIG. 3 illustrates an example scenario 300 of beam capability reporting in accordance with an implementation of the present disclosure. Scenario 300 involves a BS 310, a wireless device 320, and a UE 330, in which the BS 310 and/or wireless device 320 may be a part of a wireless network (e.g., an LTE network, a 5G NR network, an IoT network, or a 6G network). As shown in FIG. 3, at 302, the wireless device 320 may serve as a relay (e.g., an RIS, a UE, or a repeater) between the BS 310 and the UE 330 (e.g., configured by higher-layer signaling from the BS 310). At 304, the wireless device 320 may report its beam capability information for the access link to the BS 310. Specifically, the beam capability information indicates one or more non-overlapped or partially-overlapped beams. At 306, the BS 310 may transmit beam training information for the access link to the wireless device 320. Specifically, the beam training information is determined based on the beam capability information. At 308, the wireless device 320 may apply the beam training information for the beams supported for the access link. For instance, the beam training information may include beam configuration, such as (i) the number of reference signals (RSs) to be forwarded by the wireless device 320, (ii) the time-domain configuration for RS forwarding occasions, and (iii) the duration between two RS forwarding occasions.

Figure 4:
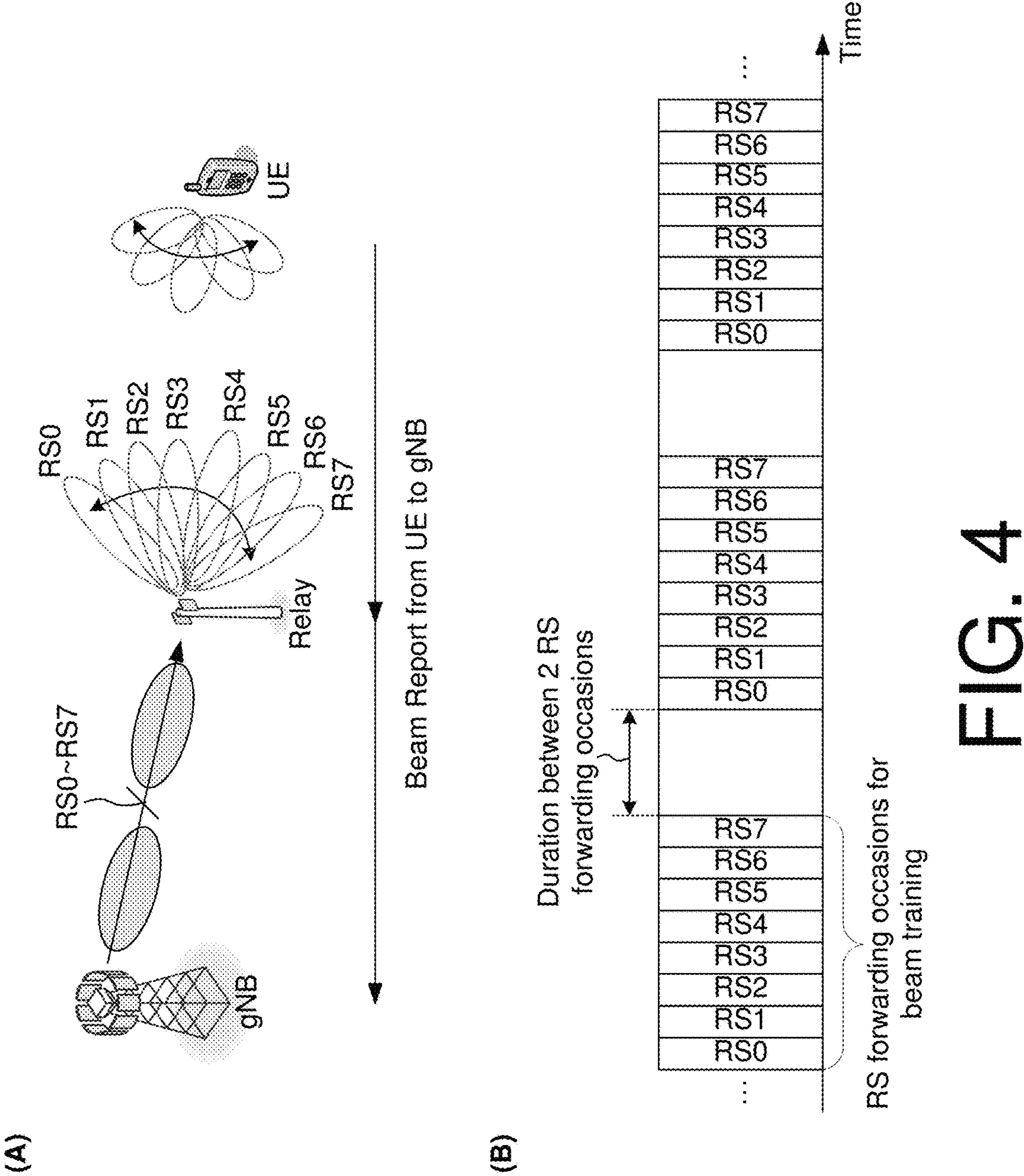
FIG. 4 is a diagram depicting an example scenario of beam training in accordance with an implementation of the present disclosure.

FIG. 4 illustrates an example scenario 400 of beam training in accordance with an implementation of the present disclosure. Part (A) of FIG. 4 shows that the relay may support/form multiple beams between the relay and the UE, and the gNB may provide multiple RSs for the relay to forward to the UE on the supported beams, respectively, such that the UE may measure these RSs and send beam report to the gNB (via the relay). Part (B) of FIG. 4 shows the RS forwarding occasions for beam training. Accordingly, the gNB may determine which RS provides the best signal quality for the UE based on the received beam report, i.e., the best beam over the access link between the relay and the UE is found, and the beam training procedure is completed.

In some implementations, the beam capability information may include information of the number of non-overlapped or partially-overlapped beams supported for the access link (e.g., the wide beams #1 and #2 in FIG. 2).

In some implementations, the beam capability information may include information of the number of non-overlapped or partially-overlapped beams supported for the access link, and each of the non-overlapped or partially-overlapped beams has a corresponding beamwidth greater than a threshold. For instance, the wireless device 320 may be able to form 8 non-overlapped or partially-overlapped beams in which only 4 beams have a corresponding beamwidth greater than the threshold, and thus, only these 4 beams with larger beamwidths are reported.

In some implementations, the beam capability information may include information of the beam indices of non-overlapped or partially-overlapped beams and the beam indices of the narrow beams associated with non-overlapped or partially-overlapped beams. For example, in scenario 200 in FIG. 2, the wide beam #1 is associated with narrow beam #1-1, narrow beam #1-2, . . . , and narrow beam #1-$x_1$, while the wide beam #2 is associated with narrow beam #2-1, narrow beam #2-2, . . . , and narrow beam #2-$x_2$.

In some implementations, the beam capability information may include information of the beam indices of non-overlapped or partially-overlapped beams with beamwidth greater than a threshold and the beam indices of the narrow beams associated with non-overlapped or partially-overlapped beams.

Alternatively, the beam capability information may not indicate non-overlapped or partially-overlapped beams. Instead, the beam capability information may indicate the number of beams supported for the access link without the consideration of whether these beams are (partially-)overlapped or not, or may indicate the beam indices of the beams (without the consideration of whether these beams are overlapped or not) and the associated narrow beams.

In some implementations, the beam capability information may include information of the number of beams supported for the access link. For instance, the wireless device 320 may be able to form 8 beams, and all of these 8 beams are reported without the need to further identify which one(s) of the beams is/are (partially-)overlapped or not.

In some implementations, the beam capability information may include information of the number of beams supported for the access link, and each of the beams has a corresponding beamwidth greater than a threshold.

In some implementations, the beam capability information may include information of the beam indices of the beams and the beam indices of the narrow beams associated with the beams.

In some implementations, the beam capability information may include information of the beam indices of the beams with beamwidth greater than a threshold and the beam indices of the narrow beams associated with the beams.

Figure 5:
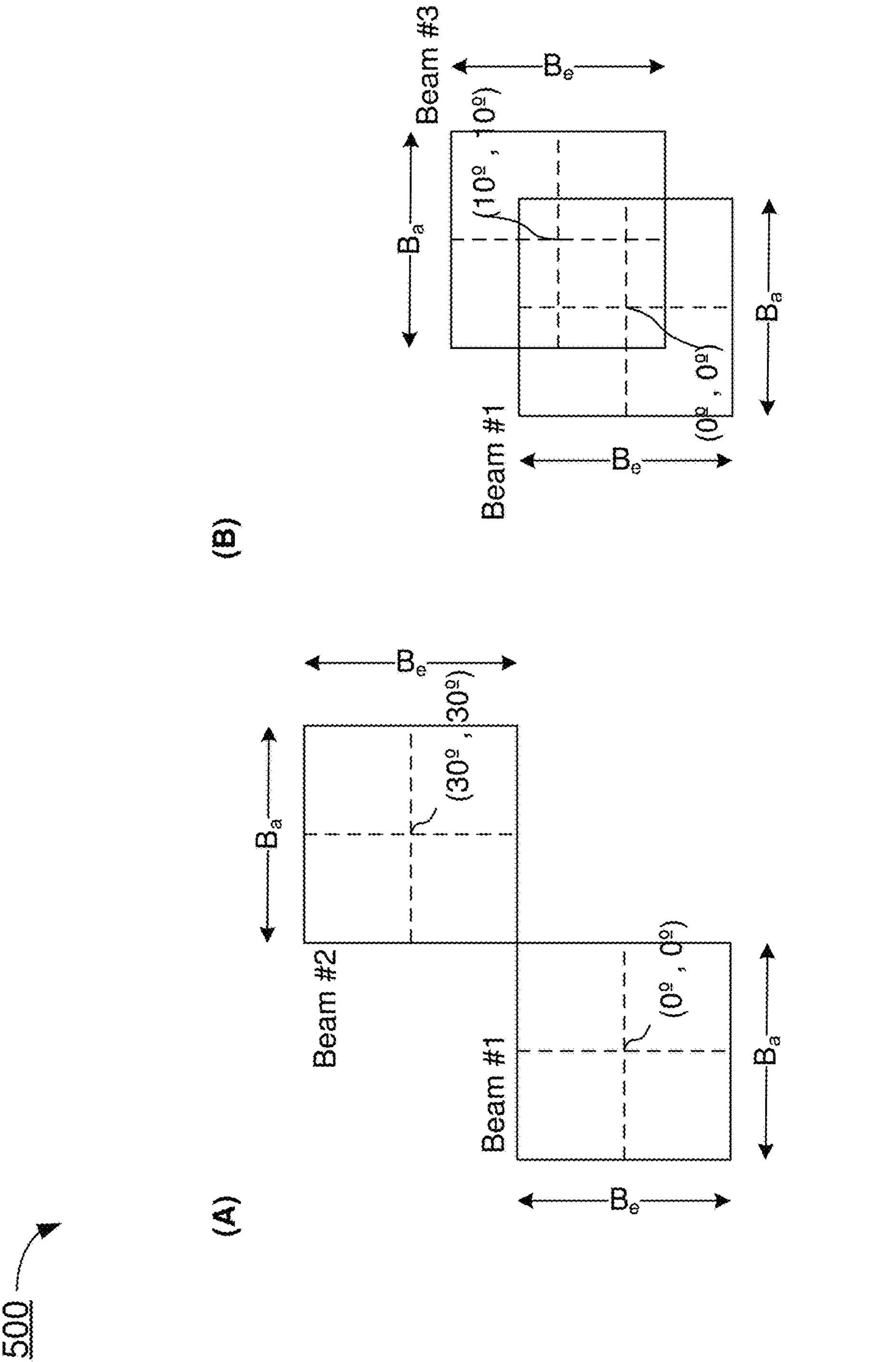
FIG. 5 is a diagram depicting an example scenario of spatial relationships between beams in accordance with an implementation of the present disclosure.

FIG. 5 illustrates an example scenario 500 of spatial relationships between beams in accordance with an implementation of the present disclosure. As shown in FIG. 5, each beam may be described with parameters, such as the 3 dB beamwidth in the Azimuth plane (denoted as Ba in FIG. 5), and the 3 dB beamwidth in the Elevation plane (denoted as Be in FIG. 5). The values of the two parameters above may be mapped to a single scalar for reporting, by $f(B_a, B_e)$. Part (A) of FIG. 5 shows the spatial relationship between two non-overlapped beams (denoted as beam #1 and beam #2), while part (B) of FIG. 5 shows the spatial relationship between two partially-overlapped beams (denoted as beam #1 and beam #3). Whether two beams are non-overlapped or partial-overlapped may be determined/defined according to their 3 dB beamwidths and broadside angles. In detail, beam #1 has a broadside angle=0 degree for both Azimuth plane and Elevation plane, and its Ba=30 degree and Be=30 degree for [−15°~15°]; beam #2 has a broadside angle=30 degree for both Azimuth plane and Elevation plane, and its Ba=30 degree and Be=30 degree for [15°~45°]; and beam #3 has a broadside angle=10 degree for both Azimuth plane and Elevation plane, and its Ba=30 degree and Be=30 degree for [−5°~25°]. Accordingly, it may be determined that beam #1 and beam #2 are non-overlapped, and beam #1 and beam #3 are partially-overlapped.

Illustrative Implementations

Figure 6:
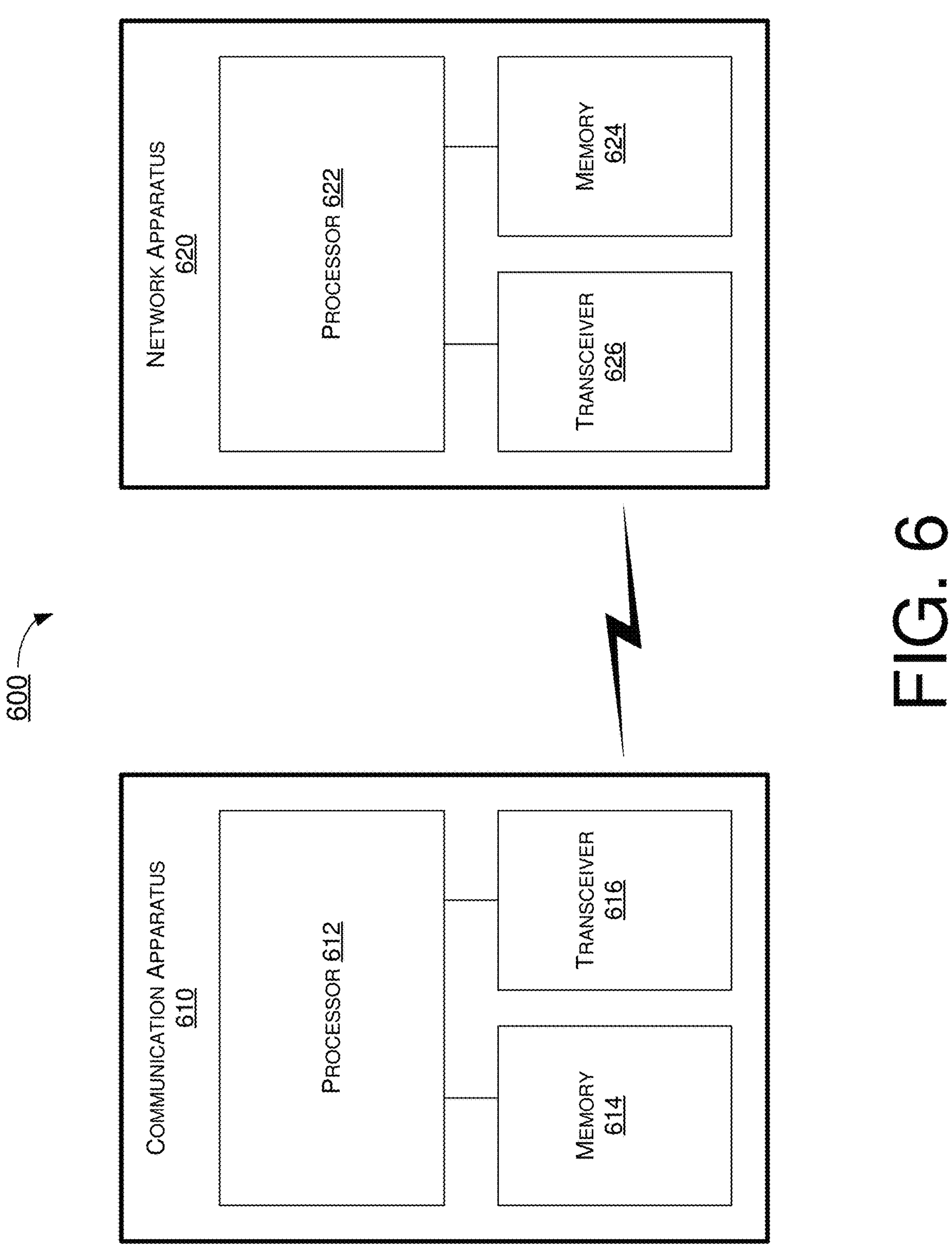
FIG. 6 is a diagram depicting an example communication system in accordance with an implementation of the present disclosure.

FIG. 6 illustrates an example communication system 600 having an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to beam capability reporting in a relay-type wireless device, including scenarios/schemes described above as well as processes 700 and 800 described below.

Communication apparatus 610 may be a part of an electronic apparatus, a wireless communication apparatus, or a computing apparatus, which may be a relay-type wireless device, such as an RIS, a UE, or a repeater, for reflecting or amplifying/decoding and forwarding radio signals between network apparatus 620 and a UE (e.g., a smartphone, a smartwatch, a personal digital assistant, a digital camera, a computing equipment such as a tablet computer, a laptop computer or a notebook computer, or a machine type apparatus such as a smart thermostat, a smart fridge, a smart door lock, a wireless speaker or a home control center). Alternatively, communication apparatus 610 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node, such as a BS, a small cell, a router or a gateway. For instance, network apparatus 620 may be implemented in an eNB in an LTE, LTE-Advanced or LTE-Advanced Pro network or in a gNB/TRP in a 5G, NR, IoT, NB-IoT or IIoT network. Alternatively, network apparatus 620 may be implemented in the form of one or more IC chips such as, for example and without limitation, one or more single-core processors, one or more multi-core processors, or one or more RISC or CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to beam capability reporting in a relay-type wireless device in accordance with various implementations of the present disclosure.

In some implementations, communication apparatus 610 may also include a transceiver 616 coupled to processor 612 and capable of wirelessly transmitting and receiving data. In some implementations, transceiver 616 may be capable of wirelessly communicating with different types of UEs and/or wireless networks of different radio access technologies (RATs). In some implementations, transceiver 616 may be equipped with a plurality of antenna ports (not shown) such as, for example, four antenna ports. That is, transceiver 616 may be equipped with multiple transmit antennas and multiple receive antennas for multiple-input multiple-output (MIMO) wireless communications. In some implementations, network apparatus 620 may also include a transceiver 626 coupled to processor 622. Transceiver 626 may include a transceiver capable of wirelessly transmitting and receiving data. In some implementations, transceiver 626 may be capable of wirelessly communicating with different types of UEs or relays of different RATs. In some implementations, transceiver 626 may be equipped with a plurality of antenna ports (not shown) such as, for example, four antenna ports. That is, transceiver 626 may be equipped with multiple transmit antennas and multiple receive antennas for MI MO wireless communications.

In some implementations, communication apparatus 610 may further include a memory 614 coupled to processor 612 and capable of being accessed by processor 612 and storing data therein. In some implementations, network apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable programmable ROM (EPROM) and/or electrically erasable programmable ROM (EEPROM). Alternatively, or additionally, each of memory 614 and memory 624 may include a type of non-volatile random-access memory (NVRAM) such as flash memory, solid-state memory, ferroelectric RAM (FeRAM), magnetoresistive RAM (MRAM) and/or phase-change memory.

Each of communication apparatus 610 and network apparatus 620 may be a communication entity capable of communicating with each other using various proposed schemes in accordance with the present disclosure. For illustrative purposes and without limitation, a description of capabilities of communication apparatus 610, as a wireless device (e.g., a relay-type wireless device), and network apparatus 620, as a network node (e.g., BS), is provided below.

Under certain proposed schemes in accordance with the present disclosure with respect to beam capability reporting in a relay-type wireless device, processor 612 of communication apparatus 610, implemented in or as a wireless device, may configure communication apparatus 610 to serve as a relay between a UE and a wireless node (e.g., network apparatus 620). Additionally, processor 612 may report, via transceiver 616, communication apparatus 610's beam capability information for a wireless link (e.g., an access link) between communication apparatus 610 and the UE to the wireless node. Specifically, the beam capability information indicates one or more non-overlapped or partially-overlapped beams. Correspondingly, processor 622 of network apparatus 620, implemented in or as a wireless node, may receive, via transceiver 626, communication apparatus 610's beam capability information for a wireless link between communication apparatus 610 and a UE from communication apparatus 610. Specifically, the beam capability information indicates one or more non-overlapped or partially-overlapped beams. Additionally, processor 622 may transmit, via transceiver 626, beam training information for the wireless link to apparatus 610. Specifically, the beam training information is determined based on the beam capability information.

In some implementations, processor 612 may also receive, via transceiver 616, beam training information for the wireless link from the wireless node. Specifically, the beam training information is determined based on the beam capability information.

In some implementations, each of the non-overlapped or partially-overlapped beams may have a corresponding beamwidth greater than a threshold.

In some implementations, the beam capability information may further indicate one or more narrow beams associated with each of the non-overlapped or partially-overlapped beams. Additionally, each of the non-overlapped or partially-overlapped beams may have a corresponding beamwidth greater than a threshold.

In some implementations, each of the non-overlapped or partially-overlapped beams may be determined/defined according to a broadside angle and beamwidths of the corresponding beam in an Azimuth plane and an Elevation plane.

In some implementations, communication apparatus 610 may include one of an RIS, another UE, and a repeater.

Illustrative Processes

FIG. 7 illustrates an example process 700 in accordance with an implementation of the present disclosure. Process 700 may represent an aspect of implementing various proposed designs, concepts, schemes, systems and methods described above, whether partially or entirely, including those described above. More specifically, process 700 may represent an aspect of the proposed concepts and schemes pertaining to beam capability reporting in a relay-type wireless device. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively, in a different order. Furthermore, one or more of the blocks/sub-blocks of process 700 may be executed iteratively. Process 700 may be implemented by or in communication apparatus 610 as well as any variations thereof. Solely for illustrative purposes and without limiting the scope, process 700 is described below in the context of communication apparatus 610 as a wireless device (e.g., a relay-type wireless device). Process 700 may begin at block 710.

At 710, process 700 may involve processor 612 of communication apparatus 610, implemented in or as a wireless device, configuring communication apparatus 610 to serve as a relay between a UE and a wireless node (e.g., network apparatus 620). Process 700 may proceed from 710 to 720.

At 720, process 700 may involve processor 612 reporting, via transceiver 616, communication apparatus 610's beam capability information for a wireless link between communication apparatus 610 and the UE to the wireless node. Specifically, the beam capability information indicates one or more non-overlapped or partially-overlapped beams.

In some implementations, process 700 may further involve processor 612 receiving, via transceiver 616, beam training information for the wireless link from the wireless node. Specifically, the beam training information is determined based on the beam capability information.

In some implementations, each of the non-overlapped or partially-overlapped beams may have a corresponding beamwidth greater than a threshold.

In some implementations, the beam capability information may further indicate one or more narrow beams associated with each of the non-overlapped or partially-overlapped beams. Additionally, each of the non-overlapped or partially-overlapped beams may have a corresponding beamwidth greater than a threshold.

In some implementations, each of the non-overlapped or partially-overlapped beams may be determined/defined according to a broadside angle and beamwidths of the corresponding beam in an Azimuth plane and an Elevation plane.

In some implementations, communication apparatus 610 may include one of an RIS, another UE, and a repeater.

FIG. 8 illustrates an example process 800 in accordance with an implementation of the present disclosure. Process 800 may represent an aspect of implementing various proposed designs, concepts, schemes, systems and methods described above, whether partially or entirely, including those described above. More specifically, process 800 may represent an aspect of the proposed concepts and schemes pertaining to beam capability reporting in a relay-type wireless device. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed iteratively. Process 800 may be implemented by or in network apparatus 620 as well as any variations thereof. Solely for illustrative purposes and without limiting the scope, process 800 is described below in the context of network apparatus 620 as a wireless node (e.g., a BS). Process 800 may begin at block 810.

At 810, process 800 may involve processor 622 of network apparatus 620, implemented in or as a wireless node, receiving, via transceiver 626, communication apparatus 610's beam capability information for a wireless link between communication apparatus 610 and a UE from communication apparatus 610. Specifically, the beam capability information indicates one or more non-overlapped or partially-overlapped beams. Process 800 may proceed from 810 to 820.

At 820, process 800 may involve processor 622 transmitting, via transceiver 626, beam training information for the wireless link to communication apparatus 610. Specifically, the beam training information is determined based on the beam capability information.

In some implementations, each of the non-overlapped or partially-overlapped beams may have a corresponding beamwidth greater than a threshold.

In some implementations, the beam capability information may further indicate one or more narrow beams associated with each of the non-overlapped or partially-overlapped beams. Additionally, each of the non-overlapped or partially-overlapped beams may have a corresponding beamwidth greater than a threshold.

In some implementations, each of the non-overlapped or partially-overlapped beams may be determined/defined according to a broadside angle and beamwidths of the corresponding beam in an Azimuth plane and an Elevation plane.

In some implementations, communication apparatus 610 may include one of an RIS, another UE, and a repeater.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

configuring, by a processor of an apparatus, the apparatus to serve as a relay between a user equipment (UE) and a wireless node of a wireless network; and reporting, by the processor, the apparatus' beam capability information for a wireless link between the apparatus and the UE to the wireless node, wherein the beam capability information indicates one or more non-overlapped or partially-overlapped beams among a plurality of beams that the apparatus supports for the wireless link.

2. The method of claim 1, further comprising:

receiving, by the processor, beam training information for the wireless link from the wireless node, wherein the beam training information is determined based on the beam capability information.

3. The method of claim 1, wherein each of the non-overlapped or partially-overlapped beams has a corresponding beamwidth greater than a threshold.

4. The method of claim 1, wherein the beam capability information further indicates one or more narrow beams associated with each of the non-overlapped or partially-overlapped beams.

5. The method of claim 4, wherein each of the non-overlapped or partially-overlapped beams has a corresponding beamwidth greater than a threshold.

6. The method of claim 1, wherein each of the non-overlapped or partially-overlapped beams is determined according to a broadside angle and beamwidths of the corresponding beam in an Azimuth plane and an Elevation plane.

7. The method of claim 1, wherein the apparatus comprises one of the following:

a reconfigurable intelligent surface (RIS);

another UE; and a repeater.

8. An apparatus, comprising:

a transceiver which, during operation, wirelessly communicates with a user equipment (UE) and a network node of a wireless network; and a processor communicatively coupled to the transceiver such that, during operation, the processor performs operations comprising:

configuring the apparatus to serve as a relay between the UE and the wireless node; and reporting, via the transceiver, the apparatus' beam capability information for a wireless link between the apparatus and the UE to the wireless node, wherein the beam capability information indicates one or more non-overlapped or partially-overlapped beams among a plurality of beams that the apparatus supports for the wireless link.

9. The apparatus of claim 8, wherein, during operation, the processor further performs operations comprising:

receiving, via the transceiver, beam training information for the wireless link from the wireless node, wherein the beam training information is determined based on the beam capability information.

10. The apparatus of claim 8, wherein each of the non-overlapped or partially-overlapped beams has a corresponding beamwidth greater than a threshold.

11. The apparatus of claim 8, wherein the beam capability information further indicates one or more narrow beams associated with each of the non-overlapped or partially-overlapped beams.

12. The apparatus of claim 11, wherein each of the non-overlapped or partially-overlapped beams has a corresponding beamwidth greater than a threshold.

13. The apparatus of claim 8, wherein each of the non-overlapped or partially-overlapped beams is determined according to a broadside angle and beamwidths of the corresponding beam in an Azimuth plane and an Elevation plane.

14. The apparatus of claim 8, wherein the apparatus comprises one of the following:

a reconfigurable intelligent surface (RIS);

another UE; and a repeater.

15. A method, comprising:

receiving, by a processor of a wireless node, an apparatus' beam capability information for a wireless link between the apparatus and a user equipment (UE) from the apparatus, wherein the beam capability information indicates one or more non-overlapped or partially-overlapped beams among a plurality of beams that the apparatus supports for the wireless link; and transmitting, by the processor, beam training information for the wireless link to the apparatus, wherein the beam training information is determined based on the beam capability information.

16. The method of claim 15, wherein each of the non-overlapped or partially-overlapped beams has a corresponding beamwidth greater than a threshold.

17. The method of claim 15, wherein the beam capability information further indicates one or more narrow beams associated with each of the non-overlapped or partially-overlapped beams.

18. The method of claim 17, wherein each of the non-overlapped or partially-overlapped beams has a corresponding beamwidth greater than a threshold.

19. The method of claim 15, wherein each of the non-overlapped or partially-overlapped beams is determined according to a broadside angle and beamwidths of the corresponding beam in an Azimuth plane and an Elevation plane.

20. The method of claim 15, wherein the apparatus comprises one of the following:

a reconfigurable intelligent surface (RIS);

another UE; and a repeater.

* * * * *